(No Model.)

J. RILEY.
REMOVABLE SINK STRAINER.

No. 587,559.　　　　　　　Patented Aug. 3, 1897.

Attest:
F. H. Schott
F. O. McCleary

Inventor:
James Riley,
by Kenner & Goldsborough,
Attys.

THE NORRIS PETERS CO., PHOTO-LITHO., WASHINGTON, D. C.

UNITED STATES PATENT OFFICE.

JAMES RILEY, OF NEW YORK, N. Y.

REMOVABLE SINK-STRAINER.

SPECIFICATION forming part of Letters Patent No. 587,559, dated August 3, 1897.

Application filed February 25, 1897. Serial No. 625,039. (No model.)

*To all whom it may concern:*

Be it known that I, JAMES RILEY, a citizen of the United States, residing at New York, in the county of New York and State of New York, have invented certain new and useful Improvements in Removable Sink-Strainers; and I do hereby declare the following to be a full, clear, and exact description of the invention, such as will enable others skilled in the art to which it appertains to make and use the same.

My invention relates to kitchen-sinks or similar tanks or receptacles.

It is well known that sinks frequently become clogged or stopped up by the accumulation upon the usual strainer in the sink-bottom of waste substances or greasy particles contained in dish-water or the like emptied into the sink, thereby causing overflow should the water-cock be left running.

The primary object of my invention is to prevent this clogging of the ordinary sink-strainer by providing the sink with a perforated inner casing or lining adapted to itself serve as a strainer and which may be readily removed from the sink and cleaned.

A further object of the present improvement is to provide a convenient drip board or shelf supported within the removable strainer.

Figure 1:
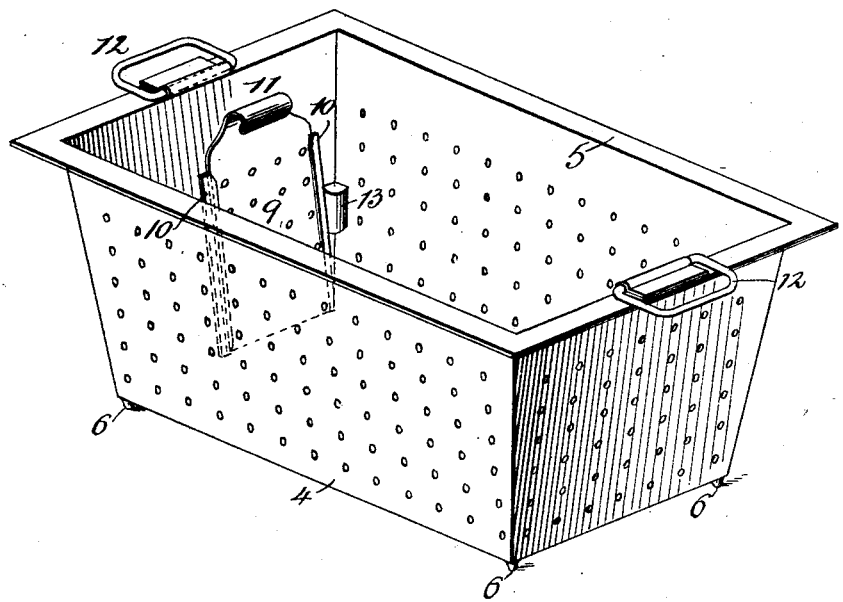
Figure 2:
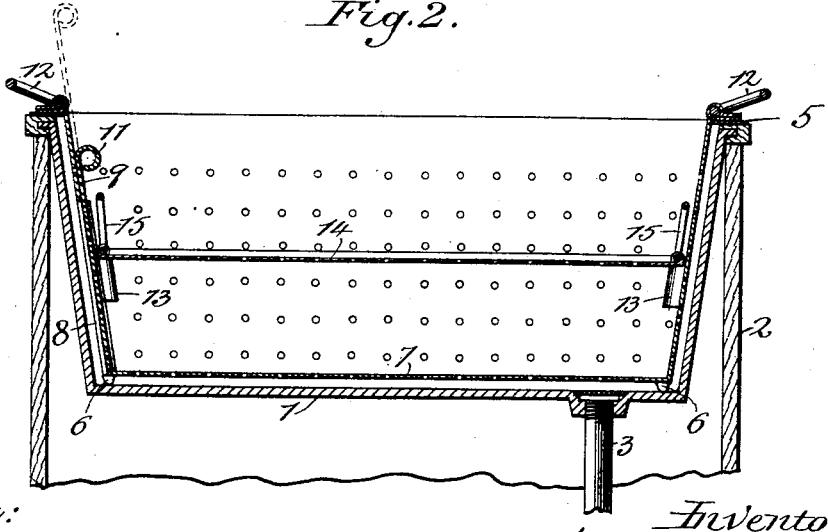

In the accompanying drawings, Figure 1 is a view in perspective of the perforated lining or strainer removed from the sink, and Fig. 2 is a central vertical longitudinal section of a sink with the strainer and draining-shelf in place therein.

The reference-numeral 1 indicates a sink inclosed by the usual casing 2 and provided with a discharge-pipe 3.

4 designates my improved inner casing or lining, which conforms to the shape of the sink and is provided at its upper edge with a flange 5, projecting outwardly from its sides and ends and adapted to extend over and rest upon the upper edge of the sink, as shown in Fig. 2.

The casing or lining 4 is provided at each of its corners with depending projections 6, which serve as feet to support the bottom 7 of the casing above the bottom of the sink.

All four sides of the casing 4, as well as its bottom 7, are formed with perforations, so that the casing serves as a strainer for the sink, permitting the escape of water to the waste-pipe 3, but preventing the passage thereto of any particles or substances which are too large to pass through the perforations of the strainer 4.

To provide for the convenient cleansing of the strainer, an opening 8 is formed in one end thereof, the lower edge of said opening being flush with the bottom of the strainer. This opening is adapted to be closed by a slide 9, supported in vertical guideways 10 and having its upper end bent upon itself to form a finger-piece 11. The slide 9 is preferably perforated, as shown. At each end of the strainer I provide a handle 12, by means of which the strainer may be lifted out of the sink when necessary. These handles, as shown in Fig. 2, preferably extend well over the ends of the sink in convenient position to be grasped by the hands.

The cleaning-opening 8 is of large area, and when uncovered it enables the strainer to be quickly cleared of refuse. The slide 9 also serves as a scraper for removing particles of material which clog the perforations of the strainer.

Within the strainer, at each corner thereof and preferably midway of its height, is a projection 13. These projections serve as supports for a perforated removable shelf or diaphragm 14, upon which dishes may be placed to drain before being wiped dry. The shelf 14 is provided with handles 15.

The utility of the removable strainer is obvious, one of its principal advantages being that even if its bottom portion should become clogged while the water is turned on the rising water would not overflow, but would escape through the perforations in the sides. By providing the removable drip board or shelf the necessity for the use of the ordinary drip-board, which occupies considerable space in a kitchen, is avoided.

Having thus described my invention, what I claim is—

1. A removable sink-strainer, comprising a perforated lining or casing, having a clearing-opening of large area, the lower edge of which is flush with the bottom of the strainer; in combination with means for lifting the strainer, and a slide which normally closes the clearing-opening, but is adapted for use as a scraper, whereby the sink may be quickly emptied of water through said opening when clogged and whereby the clogging material may be scraped from the interior of the lining and expelled through said opening.

2. A removable sink-strainer, comprising a perforated lining or casing, provided with handles, and having a discharge-opening, the lower edge of which is flush with the bottom of the strainer, in combination with a slide for closing said discharge-opening, said slide also serving as a scraper or scoop, whereby when necessary the contents of the strainer may be expelled through said opening; and a removable drip board or shelf supported within the strainer above the bottom thereof.

In testimony whereof I affix my signature in presence of two witnesses.

JAMES RILEY.

Witnesses:
WILLIAM L. SANDFORD,
JAMES T. WILLIAMSON.